United States Patent [19]

Parker

[11] 4,199,635

[45] Apr. 22, 1980

[54] FABRIC FACED LAMINATE PANEL AND METHOD OF MANUFACTURE

[75] Inventor: Roy B. Parker, Monmouth, Me.

[73] Assignee: Albany International Corp., Albany, N.Y.

[21] Appl. No.: 32,243

[22] Filed: Apr. 20, 1979

[51] Int. Cl.² .............................................. B32B 5/02
[52] U.S. Cl. ....................................... 428/95; 28/109; 28/111; 28/112; 428/235; 428/286; 428/296; 428/300; 156/62.2
[58] Field of Search ................... 428/85, 95, 102, 234, 428/235, 280, 282, 286, 288, 296, 300, 301; 28/107, 109, 111, 112

[56] References Cited

U.S. PATENT DOCUMENTS

| | | | |
|---|---|---|---|
| 3,307,990 | 3/1967 | Homier | 428/300 |
| 3,649,429 | 3/1972 | Hughes | 428/300 |

Primary Examiner—Marion E. McCamish
Attorney, Agent, or Firm—Kane, Dalsimer, Kane, Sullivan and Kurucz

[57] ABSTRACT

The disclosure is of decorative panels and the method of their manufacture. The decorative panels are laminates of textile materials, having a decorative fabric surface. The panels of the invention are particularly advantageous in that they are economical to manufacture and exhibit a high degree of structural stability, and resistance to delamination.

2 Claims, 6 Drawing Figures

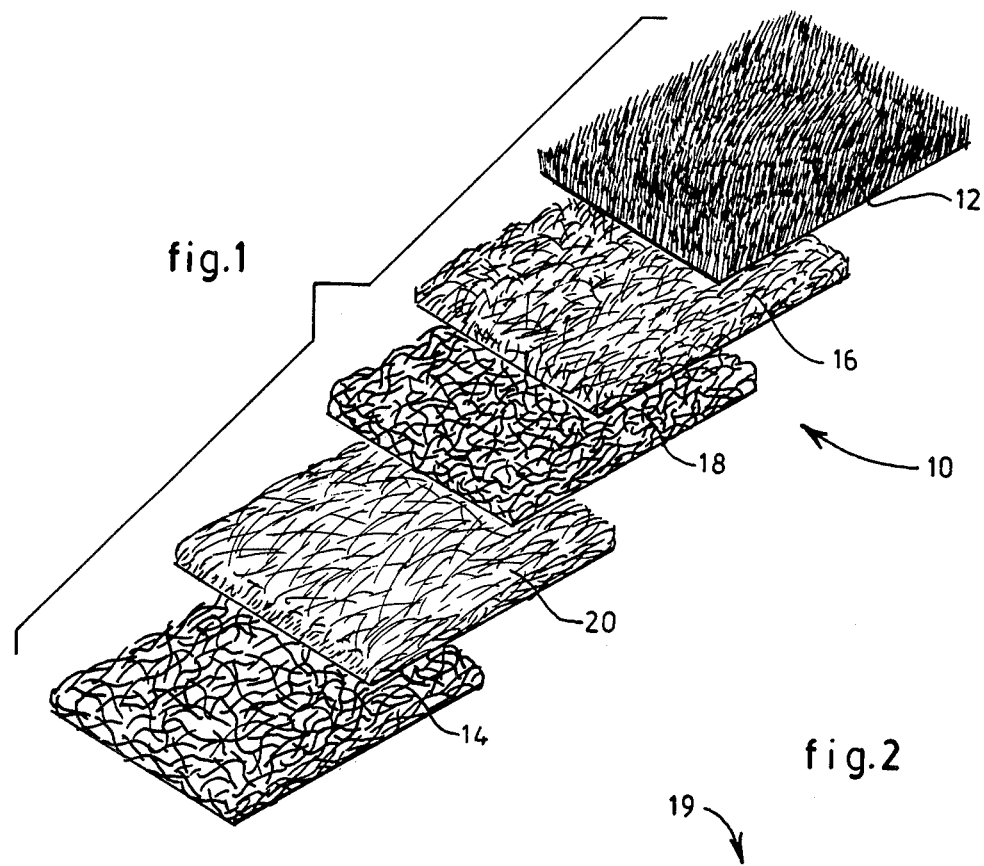
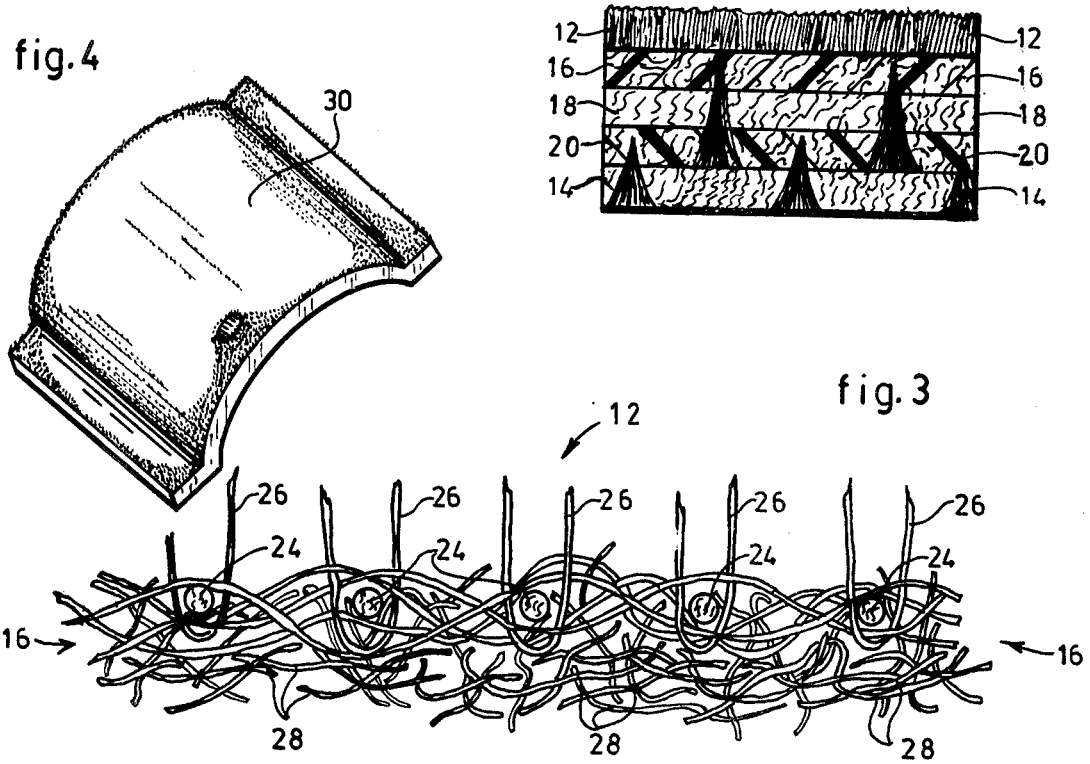

FABRIC FACED LAMINATE PANEL AND METHOD OF MANUFACTURE

BACKGROUND OF THE INVENTION

1. Field of the Invention

The invention concerns decorative panels and more particularly concerns a laminate of textile materials having a decorative fabric surface.

2. Brief Description of the Prior Art

Prior to my invention, multi-layerd textile fabrics such as those described in U.S. Pat. No. 3,307,990 were employed as a substrate for fabric faced laminates, useful as interior panels for automobiles. The fabric facing was adhered to the substrate by an interposed layer of an adhesive or glue. These prior art laminate panels were not completely satisfactory for a number of reasons related to their structural stability and particularly in regard to their ability to resist delamination.

The panels of the present invention exhibit a high degree of structural stability and are highly resistant to delamination. In addition, the panels of the invention exhibit a high degree of impact resistance while maintaining resiliency. They are esthetically acceptable and pleasing in appearance. The panels of the invention are also economical to manufacture making them highly desirable commercially. The elimination of the use of glues and adhesives in manufacture is also an advantage, eliminating the hazards of solvents associated with glues and adhesives.

In comparison to prior art panel materials of polymeric resins, the panels of the present invention are advantageous in that they are relatively non-volatile, producing few gases which can condense and deposit on surfaces nearby their installation, for example in an automobile. This phenomena has been observed in recent years and is considered a serious drawback to the use of certain polymeric resin panels in automobile interiors.

SUMMARY OF THE INVENTION

The invention comprises a decorative laminate panel, which comprises;

a core of non-woven, synthetic textile fibers;

a first layer of heat fused, synthetic, thermoplastic textile melt fibers;

a second layer which comprises a film of synthetic polymeric resin;

said first and second layers sandwiching the core, fibers of said first layer and the core being interengaged with each other and with the second layer, said interengagement being of the character obtained by needling;

a batt of non-woven textile fibers attached to the second layer by needling; and a decorative textile fabric adhered to the outer surface of the batt and the first layer, said adherence being by anchoring of the fabric ground in the fused fibers of the first layer.

The panels of the invention are useful as interior wall panels for automobiles, boats, recreational vehicles and the like. Those skilled in the art will appreciate other uses for the panels of the invention.

BRIEF DESCRIPTION OF THE DRAWINGS

FIG. 1 is an isometric view of an embodiment panel of the invention, shown with the various laminate layers separated for convenience in viewing.

FIG. 2 is a cross-sectional side elevation of the assembled panel shown in FIG. 1.

FIG. 3 is an enlarged view of the facing layers of the panel as shown in FIG. 2.

FIG. 4 is an isometric view of an interior door panel embodiment of the invention, adapted for use in automotive interior applications.

THE DETAILED DESCRIPTION OF THE PREFERRED EMBODIMENTS OF THE INVENTION

Figure 5:
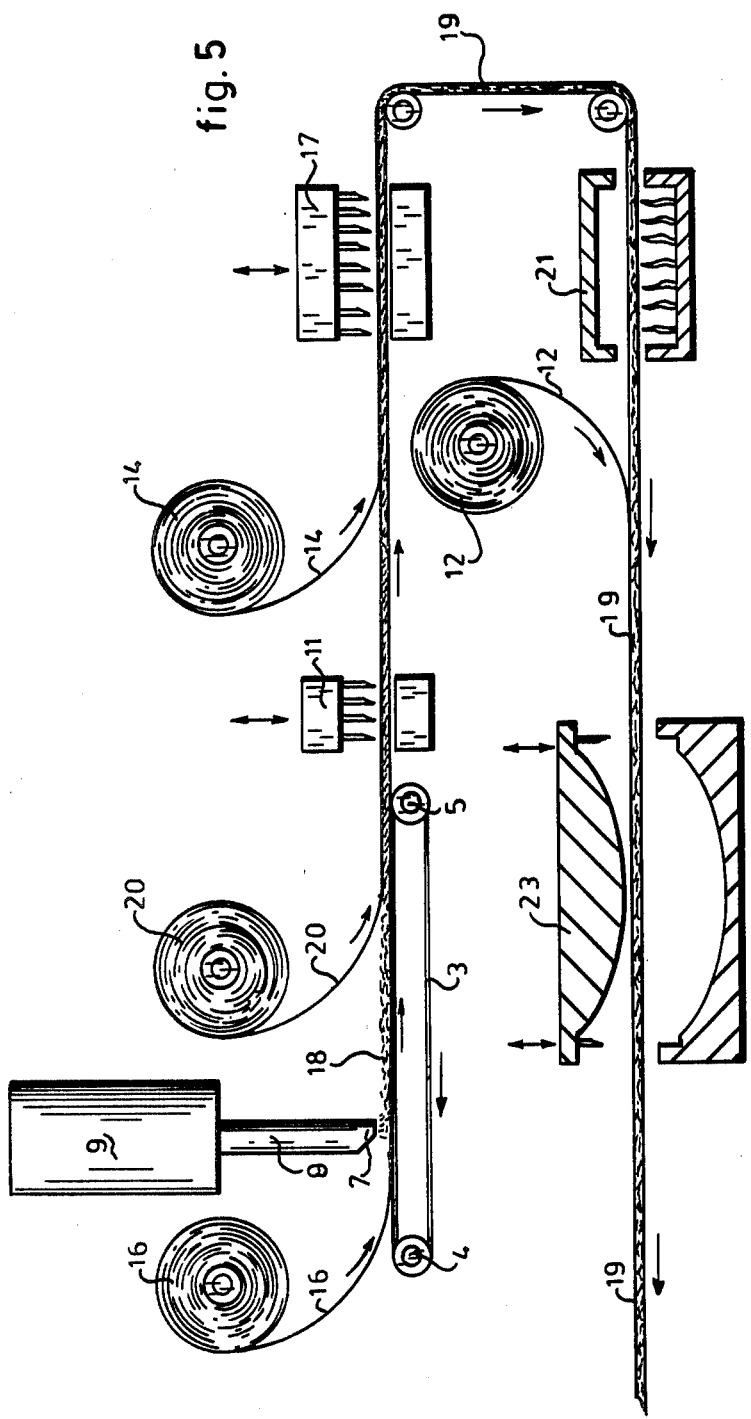
FIG. 5 is a schematic diagram of a production line for the manufacture of panels of the invention.

Referring first to FIG. 1, an isometric view of an embodiment panel of the invention may be seen, with the various laminate layers separated for ease of observation. The panel 10 consists of an outer fabric 12 layer forming a decorative surface, fused to adjacent layer 16 of thermoplastic textile fibers. The outer layer 14 may be a film of polymeric resins, but is preferably a soft textile surface fused to layer 20. The layer 20 may be a film of a polymeric resin but is preferably similar to layer 16. All of these layers sandwich a core 18 of non-woven textile fibers. All of the layers 12, 14, 16, 18 and 20 are consolidated by lamination under heat and pressure to form an integrated laminate structure of high strength, resistant to delamination and having esthetic beauty. A further understanding of how the layers 12, 14, 16, 18 and 20 are assembled and integrated into a consolidated panel structure 10 may be had by referring now to FIG. 5 which is a schematic representation of an embodiment method for the manufacture of the panel 10.

The initial step in the method of the invention may be carried out by laying down on a moving conveyor belt 3 (which is motivated by drive wheels 4, 5) a web 16 of woven, knit or non-woven thermoplastic, synthetic, heat fusible fibers. Representative of such fibers are staple fibers of polyolefins such as polyethylene, polypropylene and the like. Representative of web 16 are non-woven webs of polypropylene staple fibers. Preferably the web 16 will have a weight of from about 200 to about 700 gms/m$^2$ and a thickness of from about 3 to about 12 mm. The web 16 is carried under a depositing station 7 and receives on its upper planar surface an even, layered distribution of loose, unconsolidated, synthetic textile fiber 18. Preferably, the synthetic fibers 18 are waste fibers from shredded textile materials. The synthetic fiber 18 waste material is fed to the deposit station 7 through a conduit 8 from shredder apparatus 9 which is adapted to break up and shred waste textiles into the component fibers 18. As the web 16 bearing deposited fibers 18 is advanced on conveyor belt 3, a second web 20 of woven or non-woven, synthetic thermoplastic, fusible fibers 20 is deposited on top of fibers 18 to sandwich the core 18 between webs 16 and 20. The web 20 may be identical to web 16 or alternatively may be a film of a fusible, synthetic, thermoplastic resin such as a film of polyethylene or polypropylene. Such films are preferably employed in a thickness of from about 0.5 to about 15 mils. The sandwich structure consisting of layers 16, 18, 20 is further advanced and passes through textile needling loom 11 where the layers 16, 18 and 20 are consolidated and integrated. The techniques for needling textile layers together is well known and need not be considered in detail herein; see for example the descriptions of needling techniques in U.S. Pat. Nos. 2,059,132; 2,910,763 and 3,684,284. Thus, fibers of layers 16, 18 and 20 are interengaged and interlocked with one another, said interengagement being of the character obtained by needling. Preferably needling is in a single pass with 32 gauge multibarbed needles set in a density of from 46 to 187 needles per inch. The resulting consolidated web of layers 16, 18 and 20 then passes and receives on the upper surface, i.e.; on the outer surface of web 20 a batt 14 of non-woven textile staple fibers. The batt 14 preferably has a weight of from about 200 to about 700 gms/m$^2$ and a thickness of from about 3 to about 12 mm. The composite web of layers 16, 18, 20 carrying batt 14 on its surface then passes through a second needling operation which comprises a double pass through needle looms 17, to integrate the batt 14 with layer 20. It is important that only batt 14 and layer 20 are interlocked in this step, to maintain resiliency in the product. The resulting composite web 19 is then inverted and carried through oven 21 with batt 14 on the lower surface to raise the temperature of web 19 to or slightly above the softening point temperature of the synthetic, fusible fibers or film in layers 16 and 20. Immediately as the heat treated composite web 19 exits the oven 21, a decorative fabric 12 is deposited on the surface of layer 16. Any decorative fabric, preferably a woven or knit fabric, may be deposited. Representative of such fabrics are woven terry cloths such as those described in U.S. Pat. No. 3,187,782; and pile fabrics such as those described in U.S. Pat. No. 2,110,866. Preferably the fabric 12 will have a weight of from 150 to 800 gms/m$^2$. The fabric covered composite web 19, while still at an elevated temperature is then immediately passed into a laminating press 23 designed to press mold (shape) and cut the composite web 19 into the desired shape and size of the product panel 10.

Referring now to the FIG. 2, one may see the arrangement of layers 12, 14, 16, 18 and 20 prior to their lamination in the press 23. The inverted funnel shapes observed in layers 14, 18 and 20 are representative of the needled fibrous structures within the consolidated layers and are meant to represent the needling joining those layers structurally. It should be appreciated from FIG. 2 that specific layers are integrated by needling, but not all layers. It is believed that this unique construction is responsible in part for the advantageous properties found in the final laminate panels of the invention.

Figure 6:
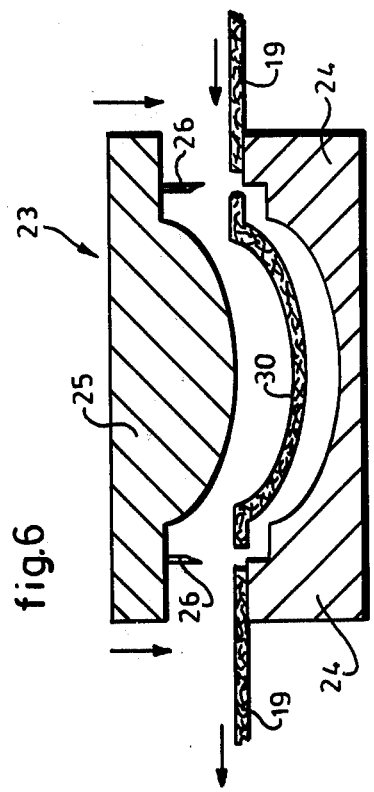
FIG. 6 is a side elevation of the press forming section of the embodiment apparatus shown in FIG. 5.

Referring now to FIG. 6, a side elevation of the press 23, one may see the press in an open condition following pressing and cutting of the composite web 19 to form the laminate product panel 30. A lower, stationary platen 24 may be heated to the fusion temperature of the resin or fibers in layer 20. The upper, moving platen 25 may be heated to the fusion temperature of the melt fibers in layer 16. At its periphery, platen 25 is provided with cutting members 26 designed to stamp out and cut along the outlines of the desired panel 30. Under pressure in the press 23, further consolidation of the above described composite layers 14, 16, 18, 20 forming panel 30 takes place and the ground of woven fabric 12 is pressed into the substance of layer 16. The hest fused fibers in layer 16 are expressed upward into surface fabric 12 so that the ground material of fabric 12 becomes anchored in layer 16 by the fused fiber melt from the layer 16. The pressure exerted in press 23 is preferably within the range of from about 5 psi to 400 psi to effect the above described consolidation of the layers 12, 14, 16, 18 and 20. Thus, considerable integration is effected between layers 12, 16 and 18. Referring now to FIG. 3, an enlarged view of the consolidated layers 12, 16 and 18 is seen following pressing in press 23. More specifically, a woven fabric 12 consisting of woven ground yarns 24 and pile fibers 26 has been pressed into layer 16. Fused and subsequently cooled melt fibers 28 from layer 16 have been expressed under heat and pressure into layer 12 to secure the ground yarns 24 and portions of pile fibers 26. Similarly, the fused fibers 28 integrate with the core 18 and fused material from layer 20 similarly is consolidated and integrated with core 18 and layer 14. The fused layer 20 may be water-impermeable if it comprises a fused film of a polymeric resin. It will be observed therefore that through heat and pressure all of the layers 12, 14, 16, 18 and 20 are further closely integrated and consolidated and the resulting laminate will exhibit a very high interlaminar shear strength. The product panel 30 as shown in FIG. 4 is removed from the press 23 and allowed to cool to ambient temperatures. When cooled, the formed panel 30 will maintain its shape as formed and will exhibit dimensional stability, shape retention and durability. The panels 30 also exhibit advantageous properties of sound and thermal insulation. The panel 30 may be part of the interior upholstery and equipment of an automobile.

One advantage of particular importance in the case of car interior equipment is that in contrast to materials used earlier, such as e.g. hardwood fiberboard slabs, the various equipment components may be shaped in a simple manner to fit their individual usage and be designed to suit the surroundings in a very convenient manner. Compared with the shaping of hard fiberboard slabs used hitherto, the productivity may be increased considerably, and by choosing a suitable kind of synthetic fiber it is possible without difficulty to reduce fire hazards inside the vehicle. Furthermore, through the choice of synthetic fiber, the generation of poisonous gases in the case of a fire is prevented.

By shaping the platens 24, 25 of the pressing tool 23 in conformity with the desired end product 30, different areas of the articles manufactured may be compressed to a larger or lesser extend, whereby varying hardness or softness of the object in different areas is obtained ranging from rigid areas suitable to serve as mountings for screws and the like, to a soft, resilient structure having considerable insulative properties. Owing to the inner layer 18 comprising a loose filler, the sandwiching layers 16, 20 are kept so far apart that following the lamination the product 30 possesses satisfactory stiffness and may be used for self-supporting structures.

The following example describes the manner and process of making and using the invention and sets forth the best mode contemplated by the inventor of carrying out the invention but is not to be construed as limiting.

EXAMPLE 1

A five layer laminate has been molded for use as a transmission trunk cover, which shows structural integrity as well as sound absorption properties. The central core of the laminate consists of the layers 16, 18 and 20, prepared as follows:

Layers 16 and 20: Two 410 g/m$^2$ batts of 50% 15 denier, 3 inch staple, polypropylene and 50% 3 denier, 2½ inch staple, polypropylene are prepared by carding and needling.

Layer 18: An 800 g/m² web of 50% 6 denier, 3 inch, polyester staple and 50% 3 denier, 2 inch, polypropylene staple is prepared by carding and layering.

Layer 18 is placed onto layer 16 and needled. The two layer fabric is then fed through another needle loom, at which station the layer 20 batt is added to the layer 18 side of the fabric.

In each of the above cases, a 32 gauge needle, having 9 barbs total, is used in a 46 density needle loom with sufficient penetrations of a depth of 0.5", so that fabric thickness, uncompressed, is 0.400".

Layer 14: One 350 g/m² batt of 100% black, 1½ denier, 3 inch, polyester is prepared by carding and needling; it is needled into layer 20 sufficiently to prevent mechanical delamination. This fabric is inverted and prepared for molding by passing it through a hot air circulating oven, which directs about 85% of air movement through the fabric. The air temperature of the oven is 365° F. The dwell time is sufficient to cause a softening and partial melting of the polypropylene fibers in layers 16 and 20; yet, not long enough to cause a flow of molten polypropylene.

At a separate station, the top surface fabric, a tufted polypropylene carpet material of 0.300" uncompressed thickness, is placed over the heated composite fabric and in direct contact with surface 16 immediately after exit from the oven. Next, the five layer material is placed directly in a pre-gapped, matched, male/female mold, which is closed until the interior temperature of the fabric is below 240° F. Removal of the heated part before sufficient cooling results in warping and distortion of the molded part.

The gap is achieved with metallic shims to cause a spacing between parallel surfaces of 0.200". The pressure exerted on each square inch of the mold surface is 40 pounds.

A representative portion of the laminate prepared was then tested for its physical properties. Those physical properties are set forth below.
 thickness of 0.300"
 weight of 3020 g/m²
 flexural strength 2500 lb/in² ave.
 breaking strength
  400 lbs/in in the machine direction
  300 lbs/in in the across machine direction
 stability of 1.0% max. shrinkage or expansion at 180° F., 95% R.H.
 stiffness of 450 g (sin $\theta=0.817$) by a Gurley Stiffness Tester.
 apparent density of 0.40 g/cc.
 true density of 0.82 g/cc.
 peel strength of (lamina shear strength) 8 lb/in.

What is claimed is:

1. A decorative laminate panel, which comprises;
   a core of non-woven, synthetic textile fibers;
   a first layer of heat fused synthetic, thermoplastic textile melt fibers;
   a second layer which comprises a film of synthetic polymeric resin;
   said first and second layers sandwiching the core, fibers of said first layer and the core being interengaged with each other and with the second layer, said interengagement being of the character obtained by needling;
   a batt of non-woven textile fibers attached to the second layer by needling; and
   a decorative textile fabric adhered to the outer surface of the first layer; said adherence being by anchoring of the fabric ground in the fused fibers of the first layer.

2. A method of producing a laminate panel which comprises:
   applying onto a continuously advancing web of melt fibers, an unconsolidated layer of synthetic textile fibers;
   applying a layer of melt fibers on top of said unconsolidated layer;
   needling said melt fiber web, said unconsolidated fiber layer and said layer of melt fibers together to form a composite web;
   applying a batt of non-woven textile fibers to one side of said composite web;
   securing said batt to said composite web by needling;
   applying a decorative fabric to the outer surface of the layer of melt fiber, to form an unlaminated web; and
   laminating the unlaminated web under heat and pressure.

* * * * *